United States Patent [19]

Sugano

[11] Patent Number: 4,607,542
[45] Date of Patent: Aug. 26, 1986

[54] HYDRAULIC CONTROL SYSTEM FOR AUTOMATIC TRANSMISSION WITH SHOCKLESS 4-3 AND 4-2 SHIFTINGS

[75] Inventor: Kazuhiko Sugano, Zama, Japan

[73] Assignee: Nissan Motor Co., Ltd., Yokohama, Japan

[21] Appl. No.: 581,509

[22] Filed: Feb. 17, 1984

[30] Foreign Application Priority Data

Feb. 25, 1983 [JP] Japan .................... 58-29386

[51] Int. Cl.$^4$ ...................... B60K 41/08; F16H 57/10
[52] U.S. Cl. ......................................... 74/869; 74/759
[58] Field of Search ............... 74/869, 868, 867, 865, 74/759, 758

[56] References Cited

U.S. PATENT DOCUMENTS

| | | | |
|---|---|---|---|
| 3,656,373 | 4/1972 | Shimosaki | 74/869 |
| 3,707,890 | 1/1973 | Ito | 74/868 |
| 3,728,915 | 4/1973 | Clark | 74/868 |
| 3,896,685 | 7/1975 | Shellman | 74/869 |
| 4,446,759 | 5/1984 | McCrary | 74/867 |

FOREIGN PATENT DOCUMENTS

| | | | |
|---|---|---|---|
| 0026925 | 4/1981 | European Pat. Off. | |
| 84101804 | 8/1984 | European Pat. Off. | |
| 0131458 | 8/1983 | Japan | 74/869 |
| 2108604 | 5/1983 | United Kingdom | 74/869 |

Primary Examiner—Allan D. Herrmann
Assistant Examiner—Stephen B. Andrews
Attorney, Agent, or Firm—Schwartz, Jeffery, Schwaab, Mack, Blumenthal & Evans

[57] ABSTRACT

Disclosed herein is a hydraulic control system for an automatic transmission wherein a first friction unit (C3) is engaged in downshifting from the 4th speed ratio to the 3rd speed ratio and it is engaged in downshifting from the 4th speed ratio to the 2nd speed ratio. A first port (124g) of a 3-4 shift valve (24) communicates with the first friction unit (C3) and it is allowed to communicate with a second port (124h) when the 3-4 shift valve (22) assumes a downshift position thereof. The second port (124h) communicates via a first passage (454) with a fluid conduit (412) supplied with an actuating fluid pressure. A second passage (452) is provided which connects the second port (124h) to the fluid conduit (412). The first and second passages are provided with first and second orifice devices (662, 660), respectively. The second fluid passage (452) is blocked when a 2-3 shift valve (22) assumes a downshift position thereof.

4 Claims, 5 Drawing Figures

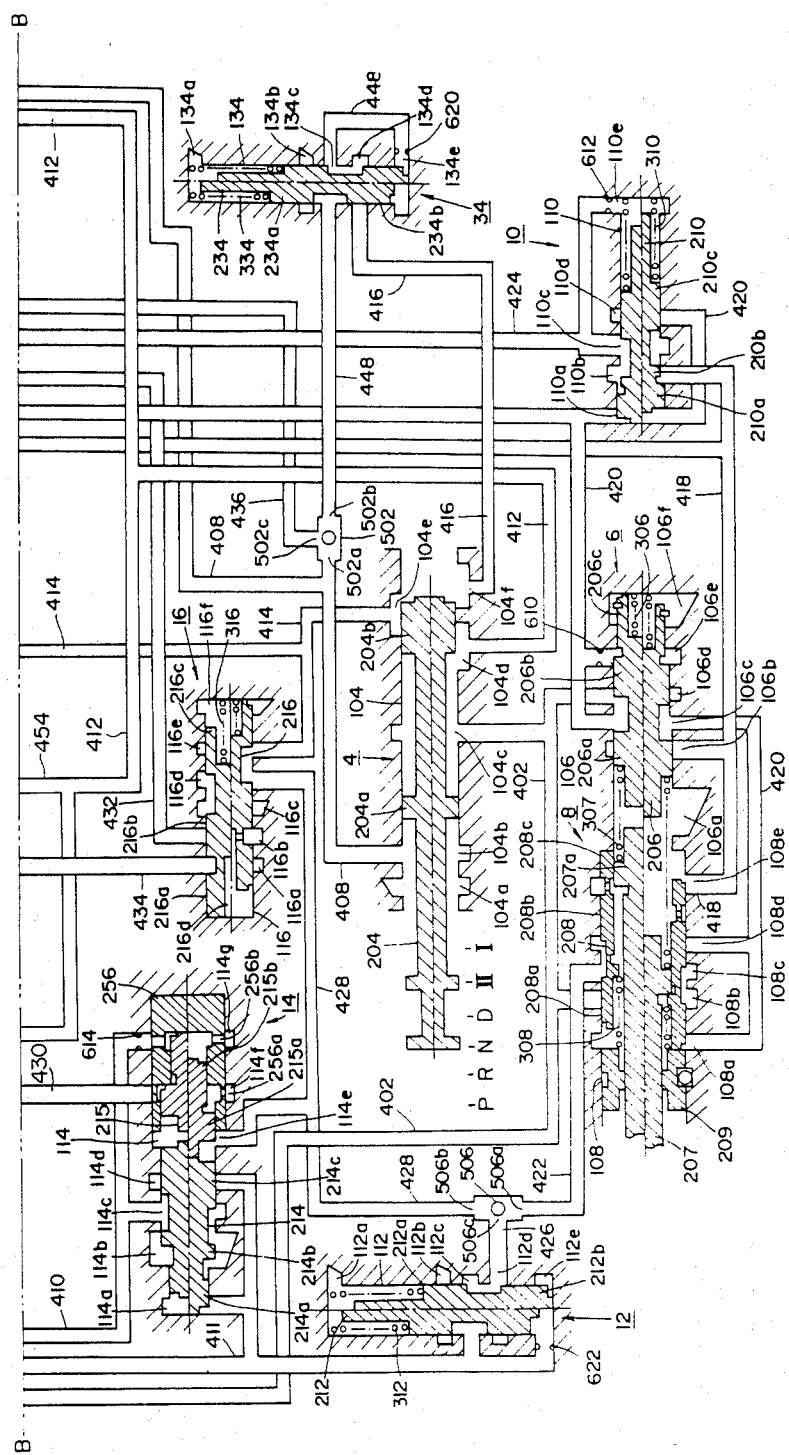

HYDRAULIC CONTROL SYSTEM FOR AUTOMATIC TRANSMISSION WITH SHOCKLESS 4-3 AND 4-2 SHIFTINGS

CROSS-REFERENCE TO RELATED APPLICATIONS

References are made to the following related copending applications, filed by the same applicant as that of the present application; U.S. patent application Ser. No. 494,647, filed May 16, 1983; U.S. patent application Ser. No. 507,228, filed June 23, 1983; U.S. patent application Ser. No. 518,413, filed July 29, 1983; U.S. patent application Ser. No. 518,540, filed July 29, 1983, now U.S. Pat. No. 4,539,870; U.S. patent application Ser. No. 518,681 filed July 29, 1983, now U.S. Pat. No. 4,532,829; U.S. patent application Ser. No. 518,745 filed July 29, 1983; and U.S. patent application Ser. No. 518,746 filed July 29, 1983.

References are also made to the following related applications, each filed by the same applicant as that of the present application and concurrently with the present application: U.S. patent application Ser. No. 581,507; U.S. patent application Ser. No. 581,508; and U.S. patent application Ser. No. 581,506.

BACKGROUND OF THE INVENTION

The present invention relates to a hydraulic control system for an automatic transmission.

Automatic transmissions are known wherein one friction unit is engaged and another friction unit is disengaged to effect a shifting between speed ratios, i.e., between drive ratios. In operating such automatic transmissions, if the engagement of the one friction unit does not take place in good timed relationship with the disengagement of the other friction unit, substantial shocks will take place or the engine will race. It is therefore desired that the engagement and disengagement timing is set to be optimum over all of running states of an automotive vehicle. An automatic transmission is known wherein one friction unit is engaged during operation with two speed ratios. If the engagement of this friction unit is effected in the same timing in shifting into a first one of the two speed ratios from another speed ratio as in shifting from a second one of the two speed ratios from the other speed ratio, optimum performance in each of the shifting operations can not be realized. Taking, for example, an automatic transmission wherein a clutch is engaged during operation with the second and third speed ratios and released during operation with the fourth speed ratio, if the clutch is engaged in the same timing in downshifting from the fourth speed ratio to the second speed ratio as in downshifting from the fourth speed ratio to the third speed ratio, the optimum performance in each of the downshifting is hardly obtained because a difference between a change in engine torque and a change in engine revolution speed before and after the shifting are different in the case of 4-2 downshifting from those in the case of 4-3 downshifting. That is, if, with the optimum timing for the 4-3 downshifting, the clutch is engaged in 4-2 downshifting, substantial shocks will take place. On the contrary, if, with the optimum timing for the 4-2 downshifting, the clutch is engaged in 4-3 downshifting, the engine will race. Therefore, a problem resides in that optimum shifting operation cannot be obtained in each of downshifting from n+2nd speed ratio to n+1st speed ratio and downshifting from the n+2nd speed ratio to nth speed ratio, where: n is a positive integer.

SUMMARY OF THE INVENTION

According to the present invention, there is provided a hydraulic control system for an automatic transmission which is shiftable into a nth speed ratio, a n+1st speed ratio and a n+2nd speed ratio, the automatic transmission including a first friction unit and a second friction unit, the first friction unit being engaged and the second friction unit being released during operation with the nth speed ratio, the first and second friction units being engaged during operation with the n+1st speed ratio, the first friction unit being released and the second friction unit being engaged during operation with the n+2st speed ratio.

The hydraulic control system comprises:
means for generating an actuating fluid pressure.
Further, the system comprises first and second shift valves. The first shift valve has a downshift position thereof and an upshift position thereof, the first shift valve assuming the downshift position thereof during operation with the nth speed ratio, the first shift valve assuming the upshift position thereof during operation with the n+1st speed ratio and the n+2th speed ratio.

The second shift valve has a downshift position thereof and an upshift position thereof, the second shift valve assuming the downshift position thereof during operation with the nth speed ratio and the n+1st speed ratio, the second shift valve assuming the upshift position thereof during operation with the n+2nd speed ratio.

The second shift valve has a first port and a second port, the first port being allowed to communicate with the second port when the second shift valve assumes the downshift position thereof, the first port communicating with the first friction unit. Further, the system comprises a means defining a first fluid supply passage having one end communicating with the second port and an opposite end communicating with the actuating fluid pressure generating means.

A first orifice device is fluidly disposed in the first fluid supply passage. Additionally, the system includes a means providing a second fluid supply passage having one end communicating with the second port and an opposite end communicating with the actuating fluid pressure generating means when the first shift valve assumes the upshift position thereof.

Finally a second orifice device is fluidly disposed in said second fluid supply passage.

An object of the present invention is to provide a hydraulic control system which provides an optimum downshifting from a n+2nd speed ratio, where n is a positive integer, to a n+1st speed ratio and an optimum downshifting from the n+2nd speed ratio to an nth speed ratio.

DETAILED DESCRIPTION OF THE INVENTION

Figure 1:
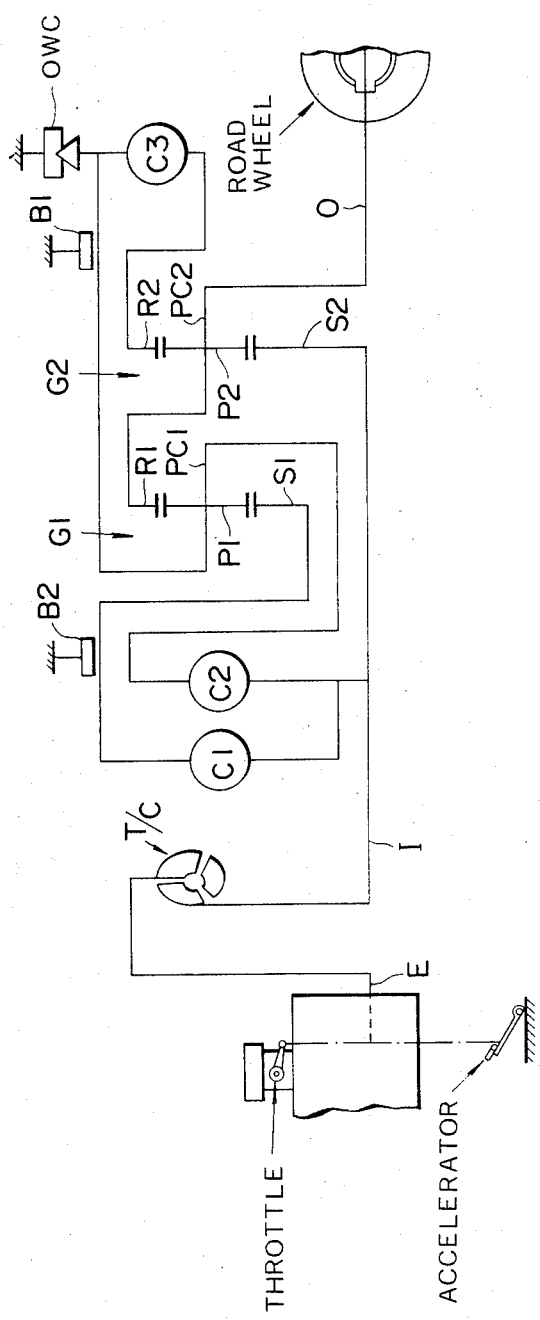
FIG. 1 is a schematic view of a power transmission mechanism of a four speed automatic transmission as illustrated with an engine having a throttle and an accelerator.

Referring to FIG. 1, there is illustrated a power transmission mechanism of a four forward speed and one reverse speed automatic transmission having an overdrive. This power transmission mechanism comprises an input shaft I operatively connected via a torque converter T/C to an engine output shaft E of an engine which has a throttle which opens in degrees, an output shaft O operatively connected to road wheels, only one being shown, via a final drive, not shown. A first planetary gear set G1 and a second planetary gear set G2 are connected between the input and output shafts I and O. A plurality of fluid operated friction units are provided which are made operative and inoperative for producing a plurality of speed ratios between the input shaft I and output shaft O. The fluid operated friction units include a first clutch C1, a second clutch C2, a third clutch C3, a first brake B1, a second brake B2, and a one-way clutch OWC. The first planetary gear set G1 comprises a sun gear S1, an internal gear R1, a carrier PC1 carrying pinion gears P1 meshing simultaneously both the gears S1 and R1. The planetary gear set G2 comprises a sun gear S2, an internal gear R2 and a carrier PC2 carrying pinion gears P2 meshing simultaneously both gears S2 and R2. The carrier PC1 is connectable via the clutch C1 with the input shaft I, and the sun gear S1 is connectable via the clutch C2 with the input shaft I. The carrier PC1 is connectable via the clutch C3 with the internal gear R2. The sun gear S2 is constantly connected with the input shaft I. The internal gear R1 and carrier PC2 are constantly connected with the output shaft O. The brake B1 is arranged to anchor the carrier PC1. The brake B2 is arranged to anchor the sun gear S1. The one-way clutch OWC is so constructed that it allows forward rotation (i.e., the same rotation as that of the engine output shaft E), but prevents reverse rotation (i.e., the rotation opposite to the forward rotation). Thus, it acts as a brake only during reverse rotation.

In the above mentioned power transmission mechanism, the rotational state of each of the rotary elements (S1, S2, R1, R2, PC1, and PC2) of the planetary gear sets G1 and G2 can be varied by actuating selected one or combination of the clutches C1, C2 and C3, brake B1, (one-way clutch OWC) and brake B2, thus varying the revolution speed of the output shaft O relative to that of the input shaft I. The four forward speed ratios and one reverse speed ratio are produced if the clutches C1, C2 and C3 and brakes B1 and B2 are engaged in the manner as shown in the following Table.

TABLE

| | C1 | C2 | C3 | B1 (OWC) | B2 | Gear Ratio | $\alpha_1 = 0.45$ $\alpha_2 = 0.45$ |
|---|---|---|---|---|---|---|---|
| 1st speed | o | | | o | | $\dfrac{1 + \alpha_2}{\alpha_2}$ | 3.22 |
| 2nd speed | o | | | | o | $\dfrac{\alpha_1 + \alpha_2}{\alpha_2(1 + \alpha_1)}$ | 1.38 |
| 3rd speed | o | o | | | | 1 | 1 |
| 4th speed | | o | | | o | $\dfrac{1}{1 + \alpha_1}$ | 0.69 |
| Reverse | | | o | | o | $-\dfrac{1}{\alpha_1}$ | −2.22 |

In the above Table, a sign "o" denotes actuation state of the clutch or brake, $\alpha_1$ and $\alpha_2$ respectively denote ratios of number of teeth of the internal gears R1 and R2 to number of teeth of the corresponding sun gears S1 and S2. A gear ratio is a ratio of the revolution number of the input shaft I to that of the output shaft O. What is denoted by the label (OWC) below the brake B1 means that the first speed ratio is produced owing to the action of the one-way clutch OWC even if the brake B1 is not applied. However, in this first speed ratio, it is not possible for the output shaft O to drive the engine (that is, no engine braking is effected).

Figure 2:
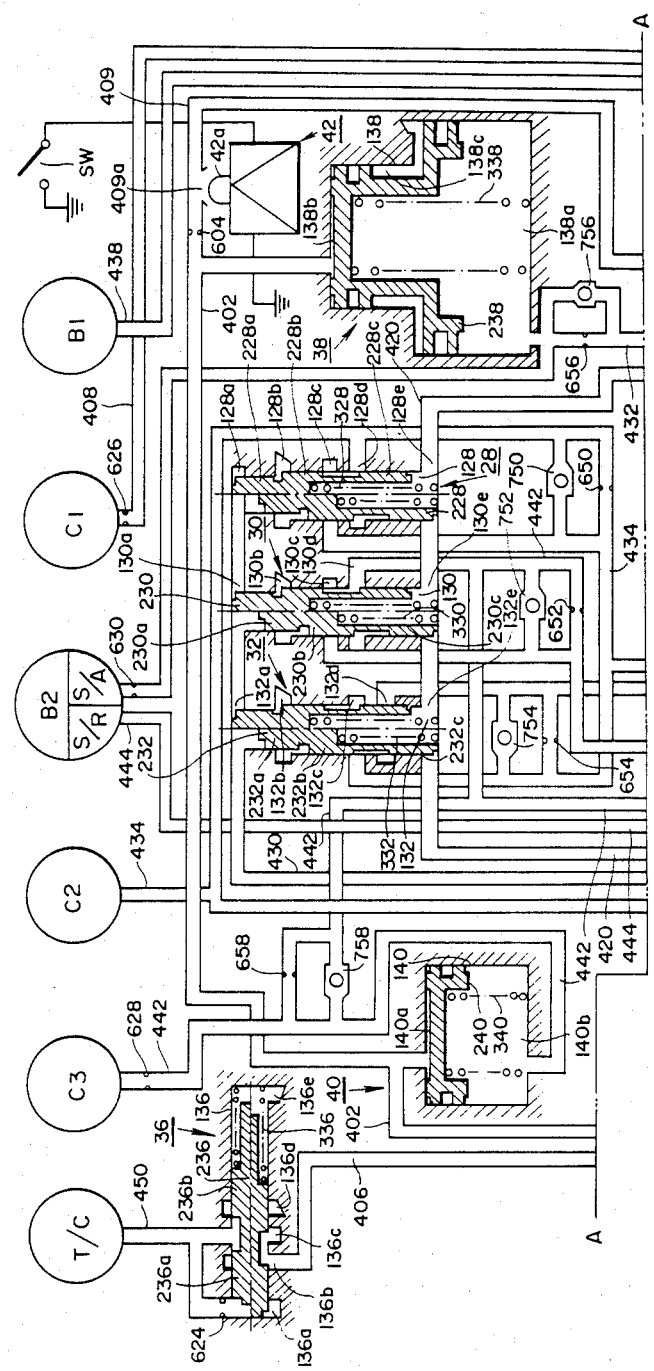
FIGS. 2(a), 2(b) and 2(c), when combined, illustrate an embodiment of a hydraulic control system for the automatic transmission according to the present invention.
Figure 2B:
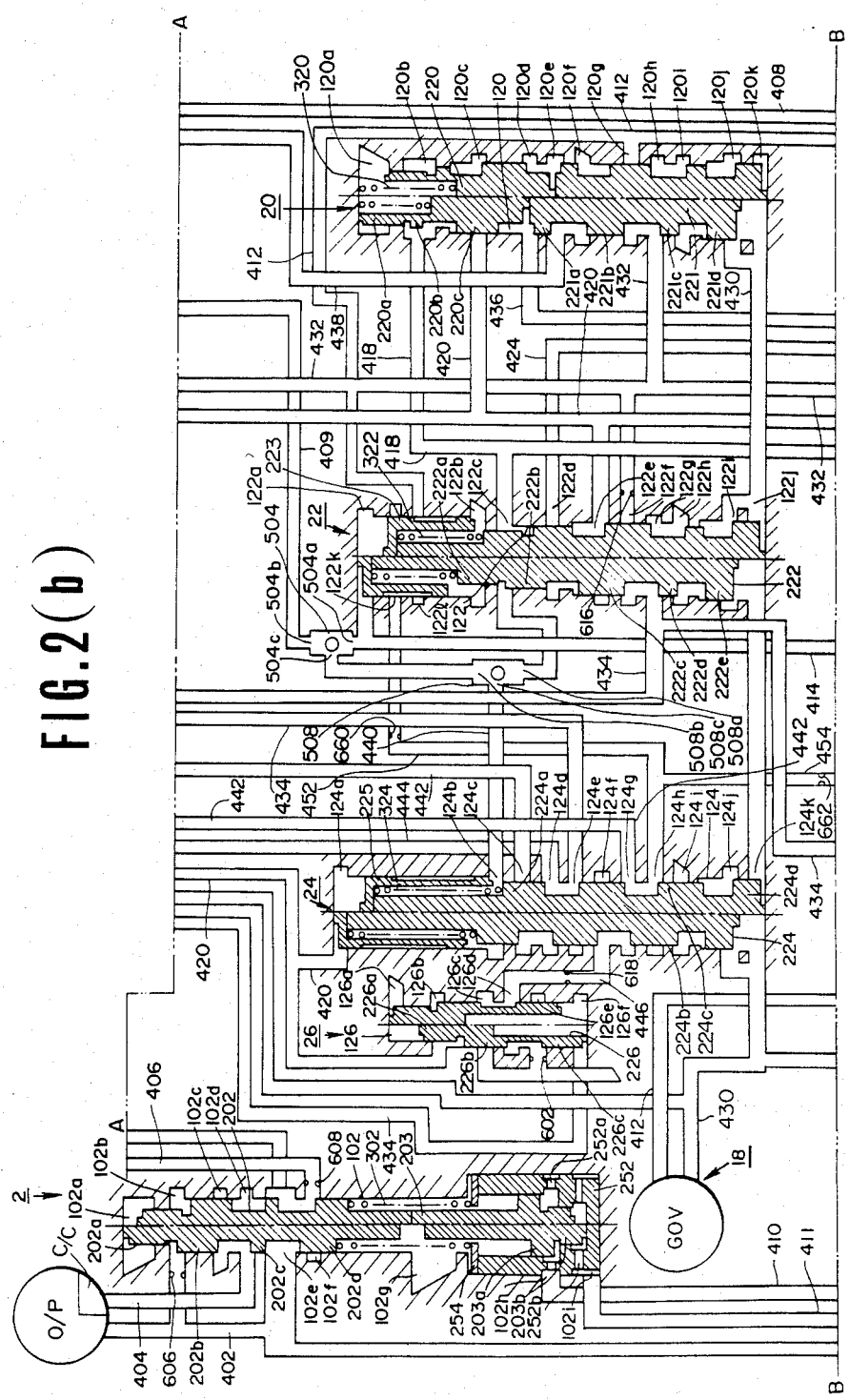

Referring to FIGS. 2(a), 2(b) and 2(c), a hydraulic control system for the above power transmission mechanism is described.

This hydraulic control system comprises a regulator valve 2, a manual valve 4, a throttle valve 6, a throttle fail safe valve 8, a throttle modulator valve 10, a pressure modifier valve 12, a cut back valve 14, a line pressure booster valve 16, a governor valve 18, a 1-2 shift valve 20, a 2-3 shift valve 22, a 3-4 shift valve 24, a 2-4 timing valve 26, a 2-3 timing valve 28, a 3-4 timing valve 30, a 3-2 timing valve 32, a first manual range pressure reducing valve 34, a torque converter pressure reducing valve 36, a 1-2 accumulator 38, a 4-3 accumulator 40, and an overdrive inhibitor solenoid 42. These valves are interconnected as shown in FIGS. 2(a), 2(b) and 2(c), and connected with an oil pump O/P, the torque converter T/C, clutches C1, C2, C3 and brakes B1, B2 as shown. The brake B2 has a servo apply chamber S/A, i.e., an oil pressure chamber designed to apply the brake when pressurized, and a servo release chamber S/R, i.e., an oil pressure chamber designed to release the brake when pressurized. Since the servo release chamber S/R has a larger pressure acting area than a pressure acting area of the servo apply chamber S/A, the brake B2 is released when the pressure is supplied to the servo release chamber S/R irrespective of the supply of oil pressure to the servo apply chamber S/A. The overdrive inhibitor solenoid 42 is electrically connected with an overdrive inhibitor switch SW.

The hydraulic control system is substantially the same as a prior proposed hydraulic control system disclosed in copending U.S. patent application Ser. No. 518,413 filed on July 29, 1983 by Kazuhiko SUGANO. This copending application is incorporated herein by reference in its entirety. Particulary, attention is directed to FIGS. 2(a), 2(b) and 2(c) and the description along therewith.

The hydraulic control system of the present application is different from the prior proposed hydraulic control system in that a port 124h of the 3-4 shift valve 24 is connected with a port 122k of the 2-3 shift valve 22 via an oil conduit 452 provided with an orifice 660 and also connected with an oil conduit 412 leading from the manual valve 4 via a branch conduit 454 provided with another orifice 662, and a port 122l of the 2-3 shift valve 22 is connected with the oil conduit 412 as opposed to the prior proposed hydraulic control system wherein the port 124h is connected with the oil conduit 412 alone.

Figure 3:
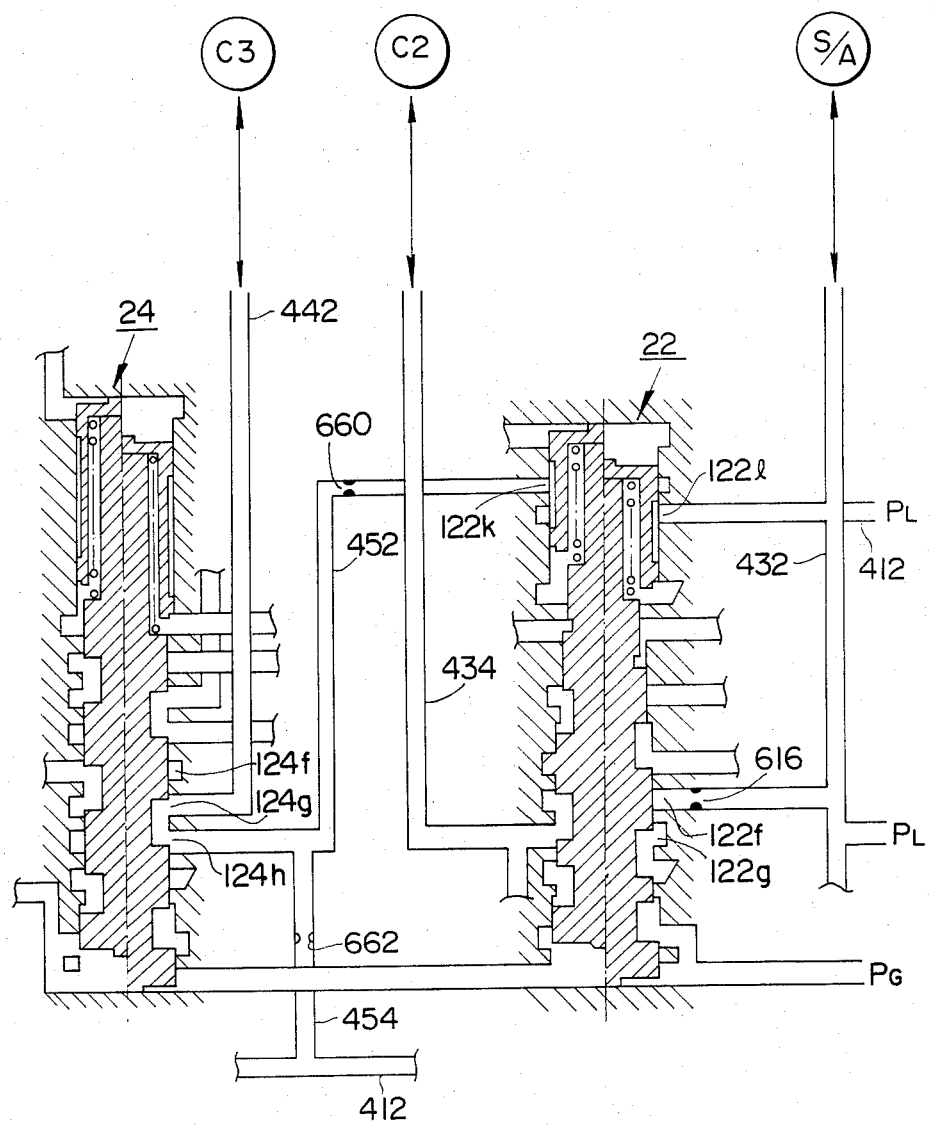
FIG. 3 is a diagram illustrating the embodiment shown in FIGS. 2(a), 2(b) and 2(c) in a simplified manner.

For ease of understanding the feature of the present invention, the following description proceeds along with FIG. 3 wherein the 2-3 shift valve 22 and 3-4 shift valve 24 are taken out.

As shown in FIG. 3, the port 122l of the 2-3 shift valve 22 (a first shift valve) is connected with the oil conduit 412 which is supplied with a line pressure when the manual valve 4 (not shown in FIG. 3) assumes D or II or I position thereof. The port 122k of the 2-3 shift valve 22 is connected via the oil conduit 452 with the port 124h (a second port) of the 3-4 shift valve 24 (a second shift valve). The oil conduit 452 is provided with the orifice 660 (a second orifice). The oil conduit 454 is provided with the orifice 662 (a first orifice). The flow sectional area of the orifice 662 is smaller than that of the orifice 660. The port 122k of the 2-3 shift valve 22 is allowed to communicate with the port 122l thereof when the 2-3 shift valve 22 assumes the upshift position thereof (as indicated by the left half thereof as viewed in FIG. 3), while they are prevented from communicating with each other when a plug 223 of the 2-3 shift valve 22 assumes the down position thereof (as indicated by the right half thereof as viewed in FIG. 3). The port 122f of the 2-3 shift valve 22 is allowed to communicate with a port 122g thereof when the 2-3 shift valve 22 assumes the upshift position thereof. This port 122g is connected via an oil conduit 434 with the clutch C2. The port 124h of the 3-4 shift valve 24 is allowed to communicate with a port 124g thereof (a first port) when the 3-4 shift valve 24 assumes the downshift position thereof. This port 124g is connected via the oil conduit 442 with the clutch C3.

Next, the operation is described.

The operation during 4-3 shifting is described. During operation with the 4th speed ratio, the 2-3 shift valve 22 and the 3-4 shift valve 24 assume the upshift positions thereof, respectively, as indicated by the left halves thereof as viewed in FIG. 3. Although not shown in FIG. 3, the 1-2 shift valve 20 also assumes the upshift position thereof and thus the line pressure is supplied to the oil conduit 432. The oil pressure in the oil conduit 432 acts in the servo apply chamber S/A and via the ports 122f and 122g of the 2-3 shift valve 22 to the clutch C2. The clutch C3 is connected via the ports 124g and 124f with the drain port. In this state, when the 3-4 shift valve 24 shifts to the downshift position thereof as indicated by the right half thereof as viewed in FIG. 3, 4-3 shifting initiates. In this case, the 2-3 shift valve 22 stays in the upshift position thereof as indicated by the left half thereof as viewed in FIG. 3. After the 3-4 shift valve 24 has shifted to the downshift position thereof, the port 124g is allowed to communicate with the port 124h. This causes the oil conduit 442 to communicate with the oil conduit 452 and the oil conduit 452 is supplied with the line pressure via the oil conduit 412, ports 122l and 122k of the 2-3 shift valve 22. The oil conduit 452 is connected via the oil conduit 454 to the oil conduit 412, thus being supplied with the line pressure also via this path. Therefore, the clutch C3 is supplied with the line pressure, establishing the 3rd speed ratio. The oil pressure supplied to the clutch C3 as mentioned above is supplied via the orifice 660 in the oil conduit 452 and the orifice 662 in the oil conduit 454. However, since the flow cross sectional area of the orifice 660 is larger than the cross sectional area of the orifice 662, the engagement of the clutch C3 is controlled in response to the flow of oil passing through the orifice 660 actually. That is, the engagement timing of the clutch C3 is determined by the orifice 660. Because the flow sectional area of the orifice 660 is set large, the clutch C3 is engaged quickly during 4-3 shifting.

Next, the operation of the 4-2 shifting is described. To effect 4-2 shifting, the 3-4 shift valve 24 and the 2-3 shift valve 22 shift simultaneously from the upshift positions thereof as indicated by the left halves as viewed in FIG. 3 to the downshift positions as indicated by the right halves thereof as viewed in FIG. 3. This causes the port 124g of the 3-4 shift valve 24 to communicate with the port 124h thereof. What is done here is the same as in 4-3 shifting. However, since the 2-3 shift valve 22 also shifts to the downshift position thereof, the communication between the ports 122k and 122l is prevented. Under this condition, the line pressure is supplied to the port 124h of the 3-4 shift valve 24 from the oil conduit 412 via the oil conduit 454. This line pressure is supplied to the clutch C3 via the port 124g of the 3-4 shift valve and the oil conduit 442. That is, the clutch C3 is engaged by the oil passing through the orifice 662 in the oil conduit 454. Therefore, the engagement timing of the clutch C3 is determined by the flow sectional area of the orifice 662. As described before, the flow sectional area of the orifice 662 is set small as compared to that of the orifice 660, the engagement timing of the clutch C3 is delayed. That is, the engagement timing of the clutch C3 during 4-2 shifting is delayed as compared to that during 4-3 shifting. The reason why the orifices 660 and 662 are set in the manner mentioned above is to decrease a difference between an engine revolution speed before and that after the shifting by lengthening the period of time of a neutral state which takes place temporarily in shifting so as to allow the engine to rapidly boost its speed in 4-2 shifting because a difference between an engine revolution speed before and that after the 4-2 shifting is large as compared to that during 4-3 shifting. As a result, the optimum shifting performances required for both 4-3 shifting and 4-2 shifting are obtained.

It will now be understood that, according to the construction described above, the engagement timing of the clutch C3 during 4-3 shifting is determined by the orifice 660, while the engagement timing of the clutch C3 during 4-2 shifting is determined by the orifice 662. Therefore, the timing of the 4-3 shifting and that during the 4-2 shifting can be set optimum without relying on a complicated valve structure.

It will therefore be understood that the timings for the two shiftings, i.e., an optimum shifting from the n+2nd speed ratio to the n+2st speed ratio and an optimum shifting from the n+2th speed ratio to the n nd speed ratio can be set separately.

I claim:

1. A hydraulic control system for an automatic transmission which is shiftable into an nth speed ratio, an n+1st speed ratio and an n+2nd speed ratio, the automatic transmission including a first friction unit and a second friction unit, the first friction unit being engaged and the second friction unit being released during operation with the nth speed ratio, the first and second friction units being engaged during operation with the n+1st speed ratio, the first friction unit being released and the second friction unit being engaged during operation with the n+2nd speed ratio, the hydraulic control system comprising:
means for generating an actuating fluid pressure;

a first shift valve having a valve element movable between a downshift position thereof and an upshift position thereof, said valve element of said first shift valve assuming the downshift position thereof during operation with the nth speed ratio, said valve element of said first shift valve assuming the upshift position thereof during operation with the n+1st speed ratio and the n+2nd speed ratio;

a second shift valve having a downshift position thereof and an upshift position thereof, said second shift valve assuming the downshift position thereof during operation of the nth speed ratio and the n+1st speed ratio, said second shift valve assuming the upshift position thereof during operation of the n+2nd speed ratio;

said second shift valve having a first port and a second port, said first port being allowed to communicate with said second port when said second shift valve assumes the downshift position thereof, said first port communicating with the first friction unit;

means for defining a first fluid supply passage having one end communicating with said second port and an opposite end communicating with said actuating fluid pressure generating means;

a first orifice device fluidly disposed in said first fluid supply passage;

means responsive to movement of said valve element of said first shift valve for establishing a second fluid supply passage having one end communicating with said second port and an opposite end communicating with said actuating fluid pressure generating means when said valve element of said first shift valve assumes the upshift position thereof, and blocking said second fluid supply passage when said valve element of said first shift valve assumes the downshift position thereof; and a second orifice device fluidly disposed in said second fluid supply passage.

2. A hydraulic control system as claimed in claim 1, wherein said second fluid supply passage establishing means comprises means defining a bore having a third port communicating with said actuating fluid pressure generating means and a fourth port communicating with said second port, and a plug mechanically coacting with said valve element of said first shift valve and movable within said bore between a first position wherein said third port is prevented from communicating with said fourth port, and a second position wherein said third port is allowed to communicate with said fourth port, said plug being movable with said valve element of said first shift valve in such a manner that said plug assumes said first position thereof when said valve element of said first shift valve assumes the downshift position thereof, whereas said plug assumes said second position when said valve element of said first shift valve assumes the upshift position thereof.

3. A hydraulic control system as claimed in claim 1, wherein said second orifice device is larger in a flow sectional area than said first orifice device is.

4. A hydraulic control system for an automatic transmission which is shiftable into a nth speed ratio, a n+1st speed ratio and a n+2nd speed ratio, the automatic transmission including a first friction unit and a second friction unit, the first friction unit being engaged and the second friction unit being released during operation with the nth speed ratio, the first and second friction units being engaged during operation with the n+1st speed ratio, the first friction unit being released and the second friction unit being engaged during operation with the n+2nd speed ratio, the hydraulic control system comprising:

means for generating an actuating fluid pressure;

a first shift valve having a valve element movable between a downshift position thereof and an upshift position thereof, said valve element of said first shift valve assuming the downshift position thereof during operation with the nth speed ratio, said valve element of said first shift valve assuming the upshift position thereof during operation with the n+1st speed ratio and the n+2nd speed ratio;

a second shift valve having a downshift position thereof and an upshift position thereof, said second shift valve assuming the downshift position thereof during operation with the nth speed ratio and the n+1st speed ratio, said second shift valve assuming the upshift position thereof during operation with the n+2nd speed ratio;

said second shift valve having a first port and a second port, said first port being allowed to communicate with said second port when said second shift valve assumes the downshift position thereof, said first port communicating with the first friction unit;

means for defining a first fluid supply passage having one end communicating with said second port and an opposite end communicating with said actuating fluid pressure generating means; and means responsive to movement of said valve element of said first shift valve for establishing a second fluid supply passage having one end communicating with said second port and an opposite end communicating with said actuating fluid pressure generating means when said valve element of said first shift valve assumes the upshift position thereof, but blocking said second fluid supply passage when said valve element of said first shift valve assumes the downshift position thereof.

* * * * *